(12) United States Patent
Weiss et al.

(10) Patent No.: US 7,291,817 B2
(45) Date of Patent: Nov. 6, 2007

(54) SCAN INDUCTION HEATING

(75) Inventors: Kuno Weiss, Esslingen (DE); Oleg S. Fishman, Maple Glen, PA (US)

(73) Assignee: Inductotherm Corp., Rancocas, NJ (US)

( * ) Notice: Subject to any disclaimer, the term of this patent is extended or adjusted under 35 U.S.C. 154(b) by 0 days.

(21) Appl. No.: 11/261,097

(22) Filed: Oct. 28, 2005

(65) Prior Publication Data

US 2006/0091136 A1    May 4, 2006

Related U.S. Application Data

(60) Provisional application No. 60/623,413, filed on Oct. 30, 2004.

(51) Int. Cl.
*H05B 6/16* (2006.01)
(52) U.S. Cl. ........................ 219/653; 219/653
(58) Field of Classification Search ................ 219/653, 219/654, 655, 656, 657, 658; *H05B 6/16*
See application file for complete search history.

(56) References Cited

U.S. PATENT DOCUMENTS

| | | | | |
|---|---|---|---|---|
| 3,596,034 A | * | 7/1971 | Mekjean | 219/628 |
| 3,684,852 A | * | 8/1972 | Seyfried | 219/641 |
| 3,743,808 A | | 7/1973 | Kasper | |
| 4,501,943 A | * | 2/1985 | Lund | 219/603 |
| 4,523,068 A | * | 6/1985 | Lund et al. | 219/633 |
| 5,529,703 A | * | 6/1996 | Sprenger et al. | 219/604 |
| 6,184,508 B1 | * | 2/2001 | Isoyama et al. | 219/603 |
| 6,555,801 B1 | * | 4/2003 | LeMieux et al. | 219/656 |
| 6,727,482 B2 | | 4/2004 | Bassill et al. | |
| 7,105,783 B2 | * | 9/2006 | Takagi et al. | 219/619 |

\* cited by examiner

*Primary Examiner*—Daniel Robinson
(74) *Attorney, Agent, or Firm*—Philip O. Post

(57) ABSTRACT

An apparatus and process are provided for scan induction heating of a workpiece. The workpiece is moved through an inductor to inductively heat treat features of the workpiece with electric power of varying frequency and duty cycle to control the magnitude of electric power as the frequency changes.

20 Claims, 8 Drawing Sheets

SCAN INDUCTION HEATING

CROSS REFERENCE TO RELATED APPLICATIONS

This application claims the benefit of U.S. Provisional Application No. 60/623,413, filed Oct. 30, 2004, hereby incorporated by reference in its entirety.

FIELD OF THE INVENTION

The present invention relates to induction heating of an elongated workpiece by scanning the workpiece with an induction coil.

BACKGROUND OF THE INVENTION

Elongated workpieces, such as a drive shaft, require heat treatment of selected features on the workpiece. For example, a first feature, such as a pinion gear, may be provided at one end of a drive shaft, and a second feature, such as a universal coupling may be provided at the other end. The gear and coupling are of different physical configurations and require different heat treatment patterns for metallurgical hardening of these components. Additionally a heat-treated feature may need to be tempered after heat treating to relieve metallurgical stresses in the material of the feature.

One method of heat treating the workpiece and features on the workpiece is by electric induction scanning (or progressive) heat treatment. In this process, the workpiece generally moves through one or more scan inductors, although in other arrangements, the workpiece may be stationery and the one or more scan inductors (coils) may move along the length of the workpiece. AC power is applied to the scan inductor to create a magnetic field around the inductor. The field magnetically couples with the workpiece to inductively heat the workpiece. AC power to the scan inductor may be varied as the workpiece passes through the inductor. For example U.S. Pat. No. 3,743,808 teaches controlling the induction power and/or the scanning velocity of the scan inductor by comparing instantaneous power and the instantaneous velocity with a known energy distribution profile. The rate at which the workpiece moves through the inductor (scan rate) can be used to control the degree of heating at the cross section of the workpiece that is coupled with the magnetic field.

Induction heat depth of penetration (induced current depth of penetration, δ) of a workpiece can be calculated from the formula:

$$\delta = 503\sqrt{\frac{\rho}{\mu F}}$$

where $\delta$ is in meters; $\rho$ is the electrical resistivity of the workpiece in ohm-meters; $\mu$ is the relative magnetic permeability of the workpiece; and F is the frequency of the supplied induction power in Hertz. Therefore depth of penetration is inversely proportional to the square root of the frequency of the applied current. If the workpiece has two features with a first feature that requires heating to a shallow depth of penetration (e.g. 2.5 mm), and a second feature that requires heating to a deeper depth of penetration (e.g. 4.5 mm), the conventional method uses an inverter with a fixed output frequency, for example 10,000 Hertz, to achieve the shallower depth of penetration. From the above equation, the inverter's output frequency should be lower than 10,000 Hz for the deeper depth of penetration of the second feature of the workpiece, but since the frequency is fixed, the induction heat scan of the second feature must be slowed down to allow for deeper heat penetration by heat conduction into the second feature. Further because of the slower scan rate, inverter output power to the induction coil must be reduced to avoid overheating of the surface of the second feature. Also a heat-treated feature may require tempering of the heat-treated feature to reduce stresses in the feature. Typically the feature is first heat treated in a first scan with low power and fixed high frequency to heat treat to the required depth of penetration, and then heated in a second scan with fixed low frequency to temper the feature.

One object of the present invention is to vary the output frequency of the inverter while adjusting the output power level of the inverter by pulse width modulation, as required to inductively heat treat and/or temper various features of a workpiece to different depths of penetration in an induction scan of the workpiece.

BRIEF SUMMARY OF THE INVENTION

In one aspect, the present invention is an apparatus for, and method of, supplying ac power with varying frequency and duty cycle to a scan induction coil based upon the heating requirements of the cross section of a workpiece moving through the scan coil. A position sensing means, such as a servomotor, can be used to provide an input to a processor that compares the inputted instantaneous position of the workpiece with a stored table of workpiece position values, each of which workpiece position values can be correlated with frequency, power level and time duration that corresponds to the required applied heat energy at that position. In one embodiment of the invention, the processor utilizes an algorithm that outputs a pulse width modulation command to the switching gate circuits of an inverter so that a decrease in the inverter's voltage pulse width results in a lower output power from the inverter to offset an increase in output power from the inverter at lower frequencies. Conversely an increase in the inverter's voltage pulse width results in a greater output power from the inverter to offset a decrease in output power from the inverter at higher frequencies.

Other aspects of the invention are set forth in this specification and the appended claims.

BRIEF DESCRIPTION OF THE DRAWINGS

The foregoing brief summary, as well as the following detailed description of the invention, is better understood when read in conjunction with the appended drawings. For the purpose of illustrating the invention, there is shown in the drawings exemplary forms of the invention that are presently preferred; however, the invention is not limited to the specific arrangements and instrumentalities disclosed in the following appended drawings.

DETAILED DESCRIPTION OF THE INVENTION

Figure 1:
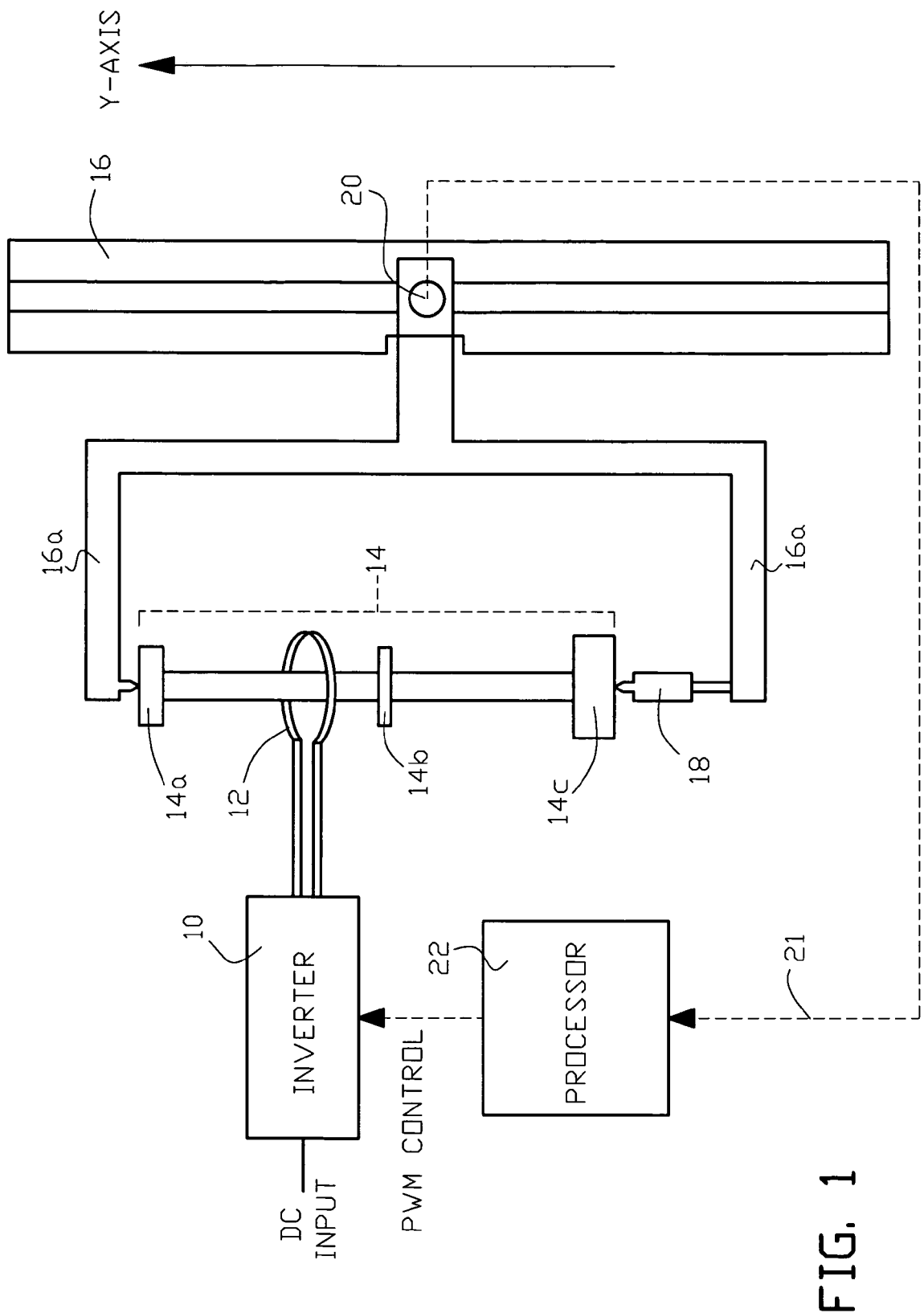
FIG. 1 is a simplified diagrammatic view of one example of the scan induction heating apparatus of the present invention.

There is shown in the figures one example of the scan induction heating apparatus of the present invention. In FIG. 1, inverter 10 supplies single phase ac power to scan inductor (coil) 12 via suitable electrical conductors such as bus bars. DC input to the inverter may be from any suitable dc power source. The inductor may comprise any type of inductor known in the art, and may be, for example, a single or multiple turn inductor, or an assembly of individual inductors that are connected to one or more ac sources of power. Workpiece 14 is held in place by a means for moving the workpiece through the inductor, which can be, for example, a screw drive assembly 16, with extended arms, 16a, to hold the ends of the workpiece. Alternatively the workpiece may be stationary and the inductor can be moved along the workpiece, or combined and coordinated movement of both the workpiece and inductor can be used. A means for rotating the workpiece, such as electric motor 18, may also be provided for rotating the workpiece as it moves through the inductor. A position sensing means, such as servomechanism 20, provides position output signal 21 to processor 22. The position output signal indicates the Y-axis position of the cross section of the workpiece that is within the inductor (i.e. the section of the workpiece that is effectively coupled with the magnetic field generated by the flow of current in the inductor).

The workpiece can have one or more features, such as features 14a, 14b and 14c that may require different depths of current penetration of induction heating power for heat treatment and/or tempering as those features pass through the inductor. The regions of the workpiece between these features may or may not require heat treatment. The multiple features may be spaced apart as shown in FIG. 1 or located adjacent to each other.

Processor 22 processes the output signal from the position sensing means to determine the power level, frequency and time duration of induction heating to be achieved at the inputted position of the workpiece relative to the induction coil as further described below.

Figure 2:
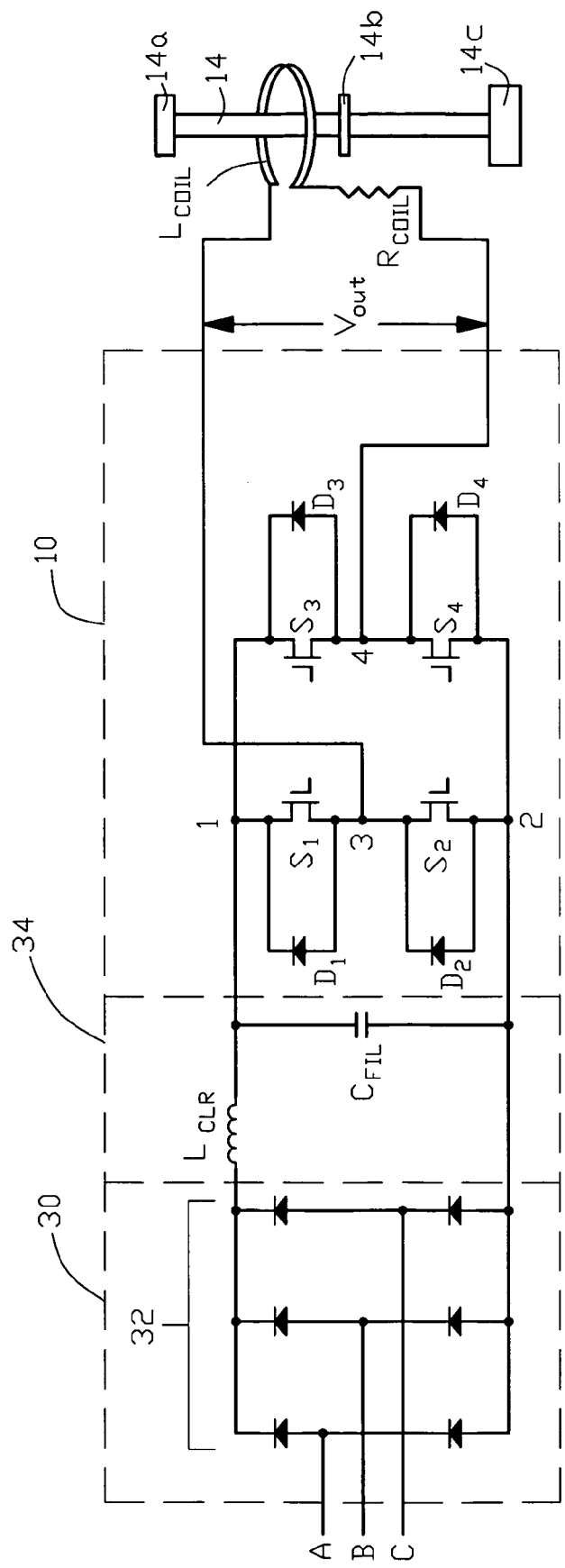
FIG. 2 is a simplified schematic of one example of a power supply and load circuit used with the scan induction heating apparatus of the present invention.

FIG. 2 is a simplified schematic of one example of an ac to dc power supply used with inverter 10 that illustrates one method of supplying dc power to the inverter. Rectifier section 30 comprises a full wave bridge rectifier 32 with ac power input on lines A, B and C supplied from a suitable source, such as utility power. Filter section 34 comprises current limiting reactor $L_{CLR}$ and dc filter capacitor $C_{FIL}$. Inverter section 10 comprises four switching devices, $S_1$, $S_2$, $S_3$ and $S_4$, and associated anti-parallel diodes $D_1$, $D_2$, $D_3$ and $D_4$, respectively. Each switching device can be any suitable solid state device, such as an insulated gate bipolar transistor (IGBT). The load circuit connected to the output of inverter 10 comprises scan inductor $L_{COIL}$ and workpiece 14, which has regions, or features, that are coupled with the magnetic field generated around the inductor when the workpiece or inductor are moved relative to each other. Resistance of the workpiece and the scan inductor ($R_{COIL}$) comprise the load resistance $R_{LOAD}$.

Figure 3A:
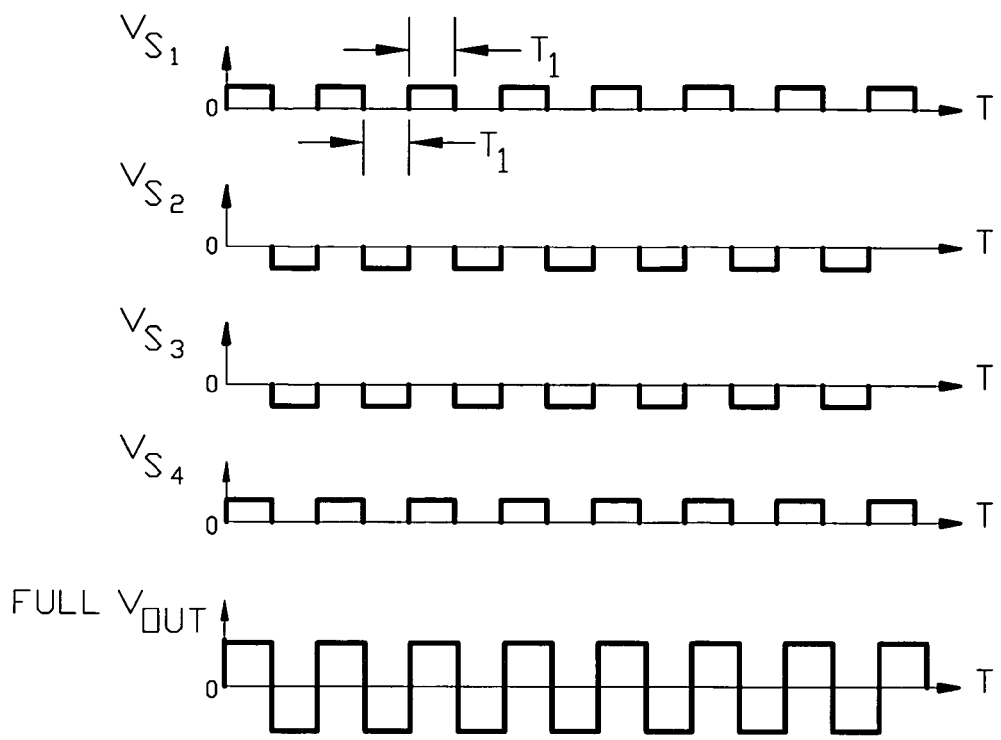
FIG. 3(a) and FIG. 3(b) illustrate the application of pulse width modulation to change the inverter's output from full power to half power.
Figure 3B:
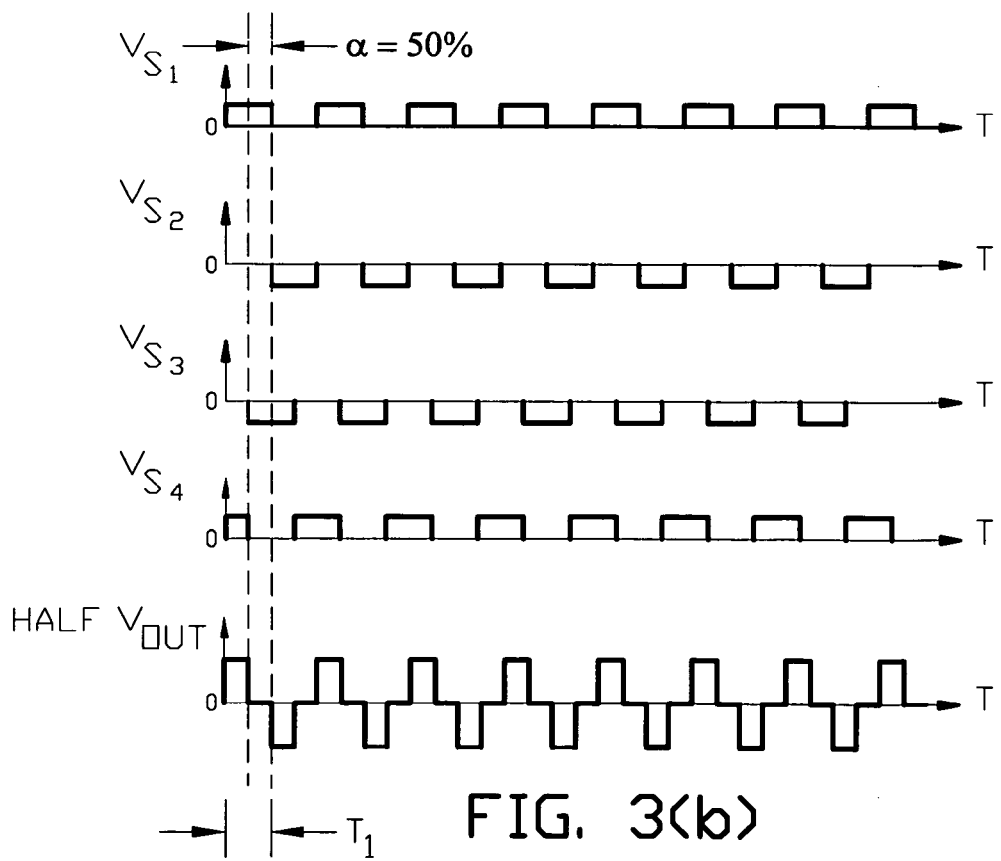

FIG. 3(a) illustrates the typical output voltage waveform (FULL $V_{OUT}$) of the bridge inverter shown in FIG. 2 with no modulation of the voltage pulse width. Inverter switches $S_1$ and $S_4$ conduct during a first time period, $T_1$, and inverter switches $S_2$ and $S_3$ conduct during a non-overlapping second time period, $T_1$, to produce the illustrated full output voltage waveform with a frequency equal to $\frac{1}{2}T_1$. FIG. 3(b) illustrates the typical output voltage waveform (HALF $V_{OUT}$) of the bridge inverter with 50 percent duty cycle ($\alpha$). Each of the inverter switches continues to conduct for the same period of time, $T_1$, as in FIG. 3(a), but with the conduction periods for switches $S_3$ and $S_4$ advanced by half a time period (i.e., the duty cycle is equal to 50 percent) to produce the illustrated half of full output voltage. With this arrangement, the load is shorted every half period. Changing the duration of the overlapping conduction periods for switches $S_3$ and $S_4$ results in different values for the duty cycle. Since power is proportional to the square of the supplied voltage, the power applied to the inductor will also change as the duty cycle changes. In the present invention variable frequency control is achieved by changing the time period, $T_1$, while the magnitude of the voltage (power) is adjusted by changing the duty cycle.

The effects on the output characteristics of a power supply with varying output frequency that does not use the pulse width modulation control of the present invention is illustrated with a baseline load circuit for a particular workpiece. For an inverter having output power of 100,000 Watts ($P(f_0)$) at 635 volts ($V_{OUT}$), and frequency ($f_0$) of 10,000 Hertz, baseline load circuit characteristics are established as:

$L_0 = 30 \times 10^{-6}$ Henries inductance of the inverter load;

$R_0 = 0.4$ ohms resistance of the inverter load; and $Q_0 = (2 \cdot \pi \cdot f_0 \cdot L_0)/R_0 = 4.712$ for the load circuit Q factor.

Baseline peak load current, $I_0$, can be calculated as 772.45 amperes from equation (1):

$$I_0 = \frac{V_{OUT}}{R_o} \cdot \left(1 - e^{\frac{-R_o}{2L_0\sqrt{f \cdot f_o}}}\right).$$

Figure 4A:
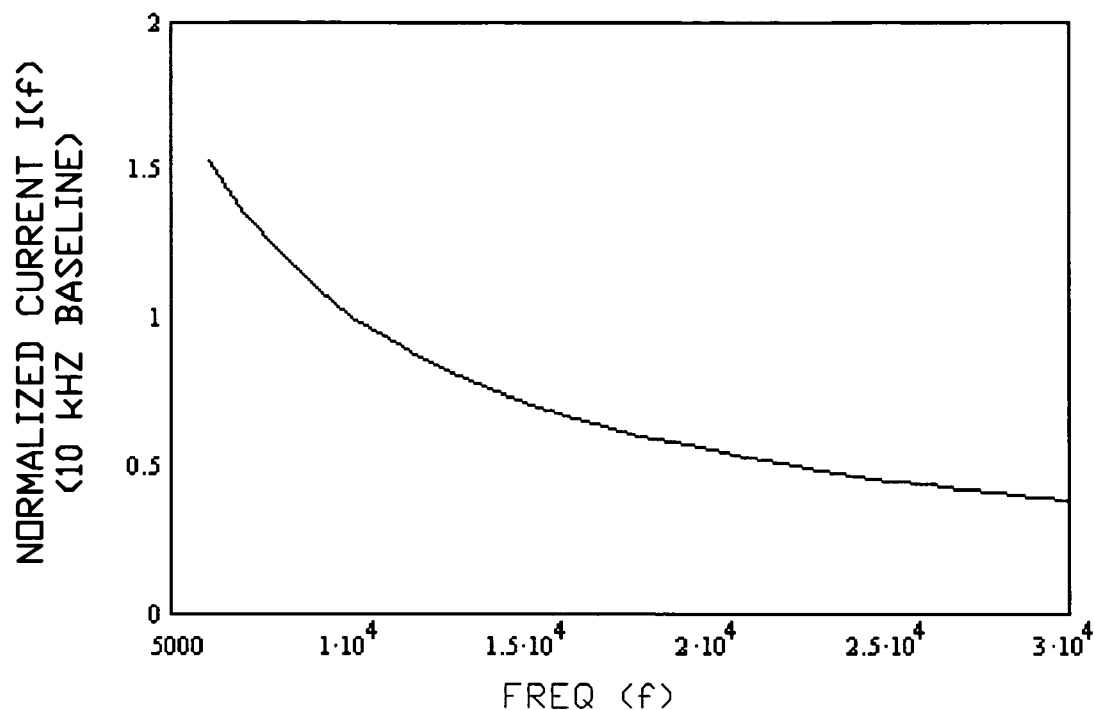
FIG. 4(a) illustrates the change in load current magnitude with a change in the frequency output of an inverter with no pulse width modulation.

FIG. 4(a) illustrates the decrease in inductor current, I(f), normalized to the baseline current, as the output frequency, f, of the inverter increases, which can be calculated from equation (2):

$$I(f) = \frac{V_{OUT}}{R_o\sqrt{\frac{f}{f_o}}} \cdot \left(1 - e^{\frac{-R_o}{2L_0\sqrt{f \cdot f_o}}}\right).$$

Figure 4B:
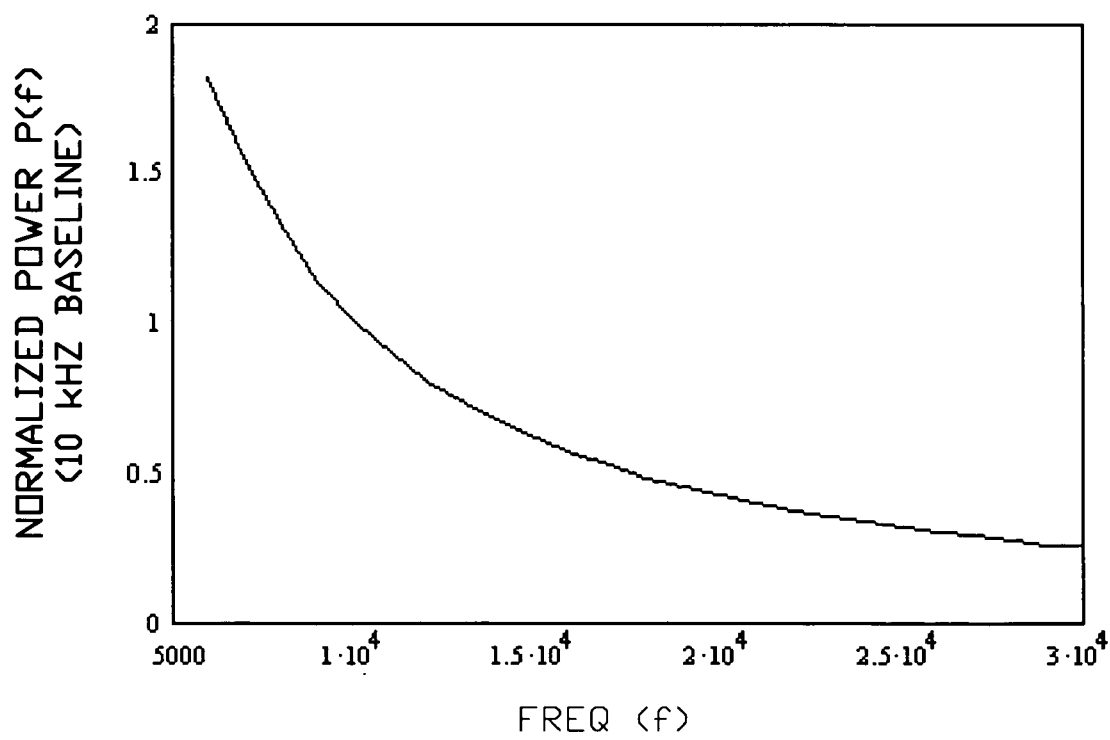
FIG. 4(b) illustrates the change in load power magnitude with a change in the frequency output of an inverter with no pulse width modulation.

FIG. 4(b) illustrates the decrease in induction heating power, P(f), normalized to the baseline power, as the output frequency, f, of the inverter increases, which can be calculated from equation (3):

$$P(f) = \frac{V_{OUT}^2}{2R_o\sqrt{\frac{f}{f_o}}} \cdot \left(1 - e^{\frac{-R_o}{2L_0\sqrt{f \cdot f_o}}}\right)^2.$$

Figure 4C:
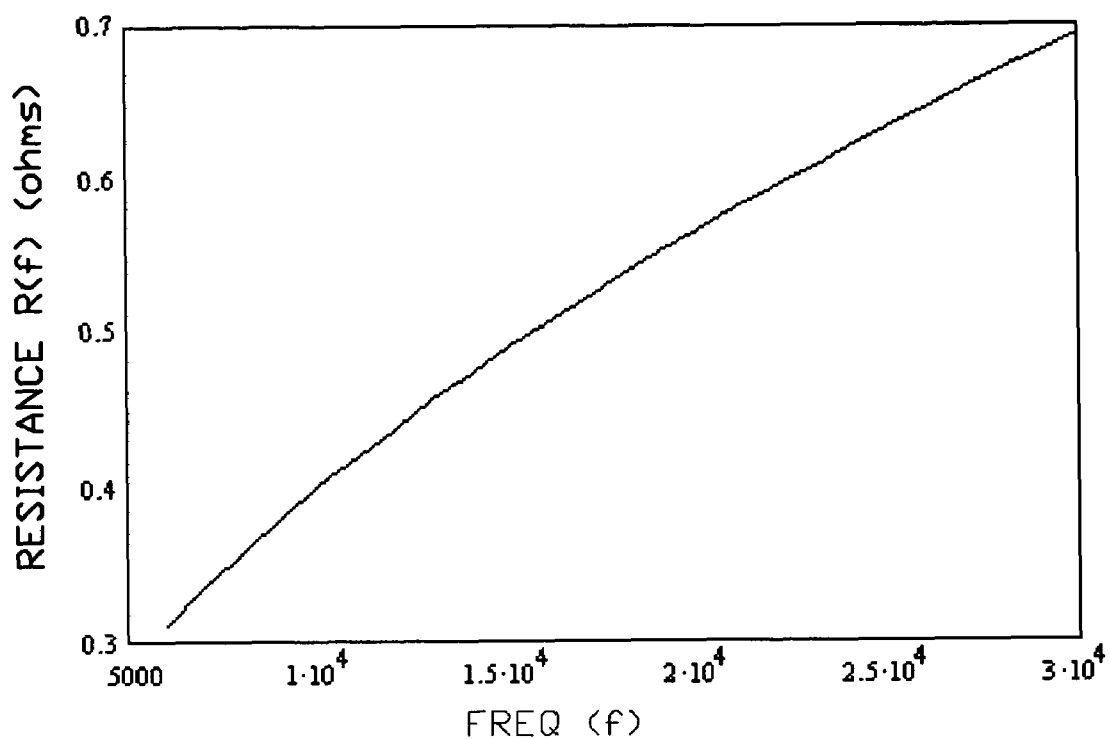
FIG. 4(c) illustrates the change in load resistance with a change in the frequency output of an inverter with no pulse width modulation.

FIG. 4(c) illustrates the increase in load resistance, R(f), as the output frequency, f, of the inverter increases, which can be calculated from equation (4):

$$R(f) = R_o \cdot \sqrt{\frac{f}{f_o}}.$$

Figure 4D:
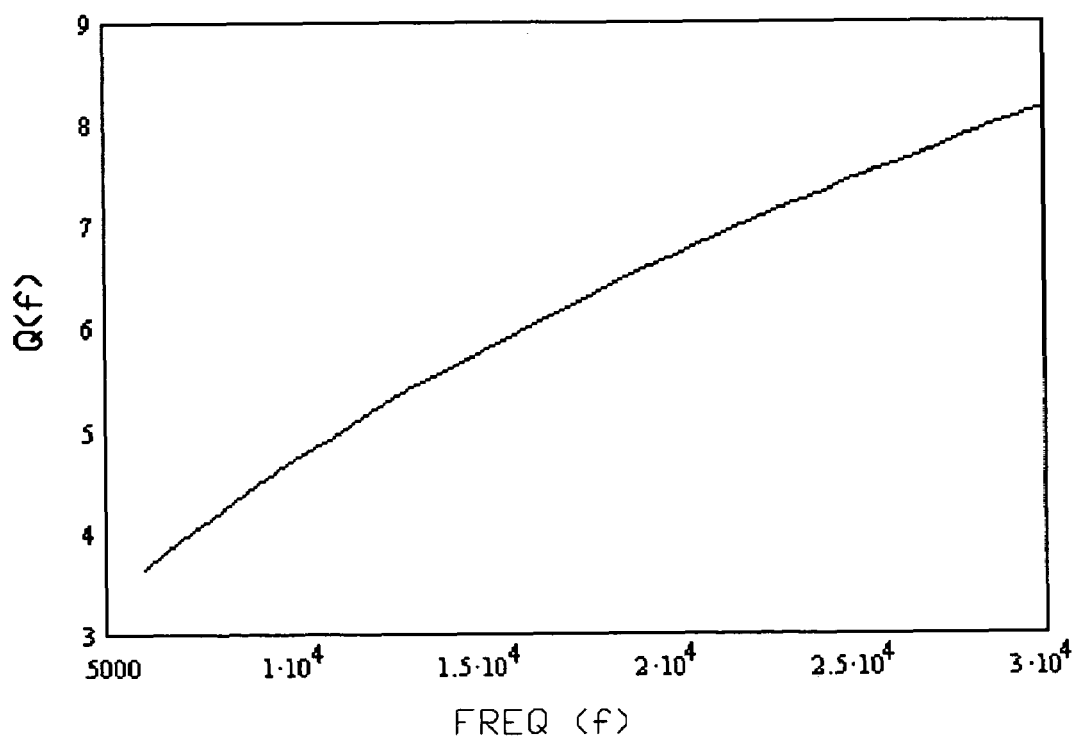
FIG. 4(d) illustrates the change in the Q factor of the load circuit with a change in the frequency output of an inverter with no pulse width modulation.

FIG. 4(d) illustrates the increase in the Q factor of the load circuit as the output frequency, f, of the inverter increases, which can be calculated from equation (5):

$$Q(f) = Q_0 \cdot \sqrt{\frac{f}{f_o}}.$$

Figure 5A:
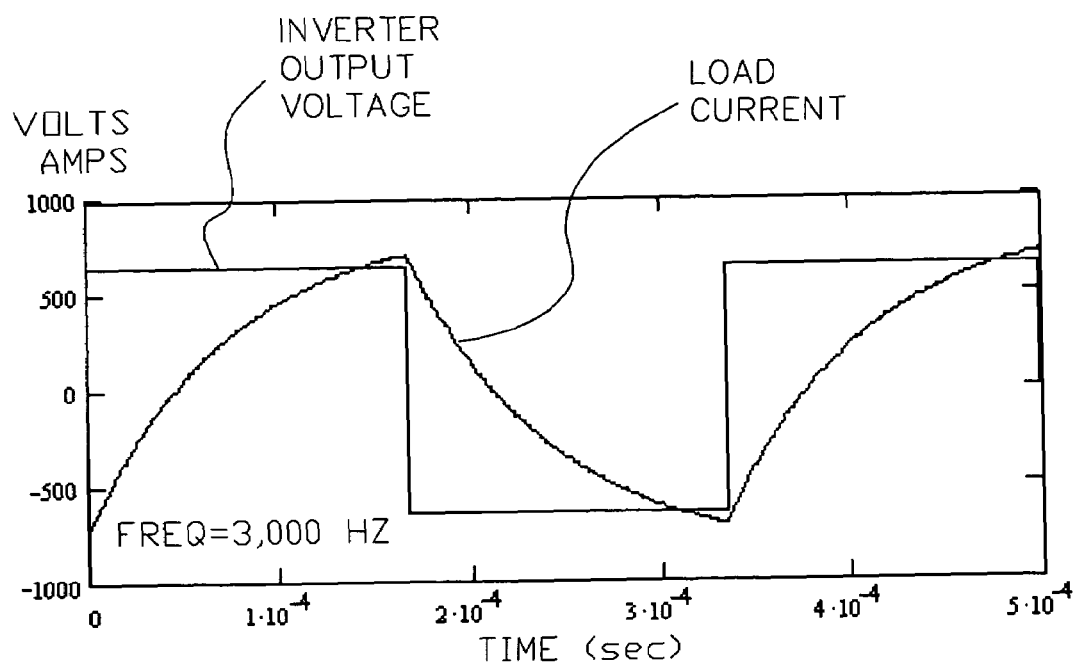
FIG. 5(a) illustrates the relationship between an inverter's output voltage and load current with an inverter output frequency of 3,000 Hertz and no pulse width modulation.
Figure 5B:
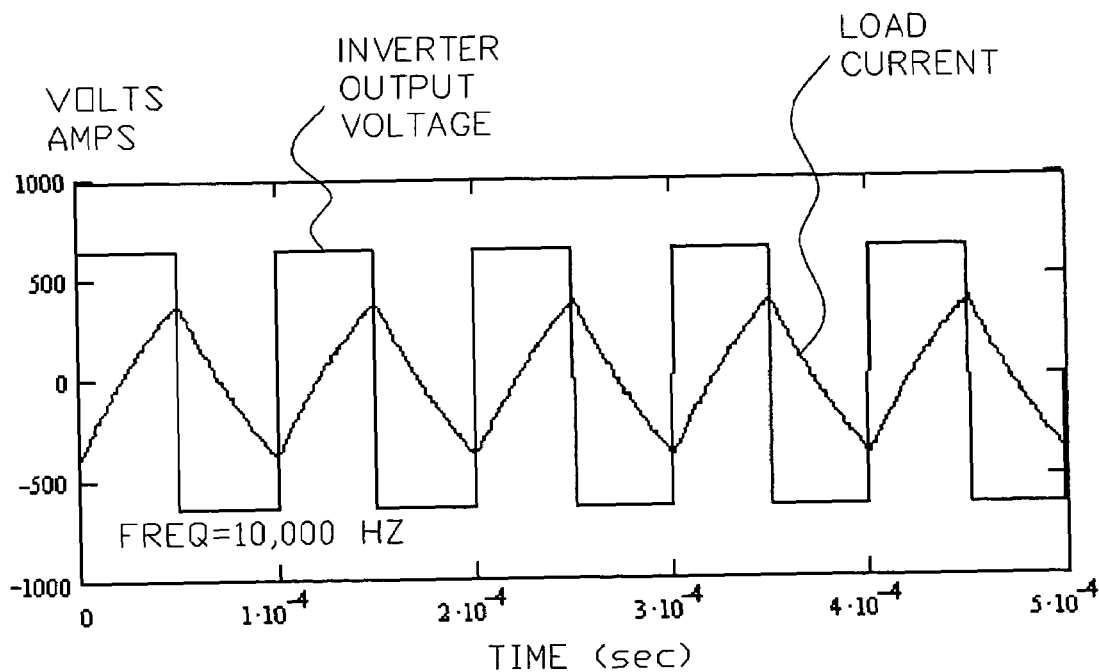
FIG. 5(b) illustrates the relationship between an inverter's output voltage and load current with an inverter output frequency of 10,000 Hertz and no pulse width modulation.
Figure 5C:
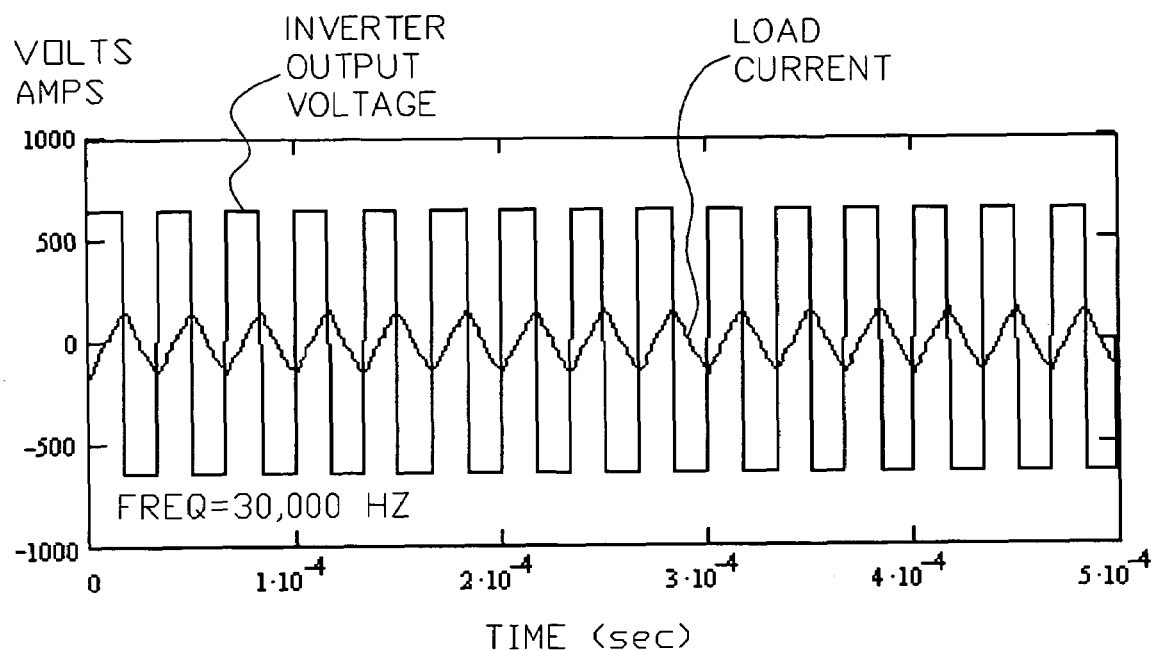
FIG. 5(c) illustrates the relationship between an inverter's output voltage and load current with an inverter output frequency of 30,000 Hertz and no pulse width modulation.

FIG. 5(a) through FIG. 5(c) illustrate the generalized relationships in FIG. 4(a) through FIG. 4(d) for a specific example wherein pulse width modulation control of the present invention is not used. FIG. 5(c) graphically represents voltage and current outputs of an inverter operating at rated full power and a frequency of 30,000 Hertz with no pulse width modulation control.

In FIG. 5(a) the output frequency of the inverter is lowered to 3,000 Hertz and the current (and power) output is relatively high without pulse width modulation control. In the present invention pulse width modulation control of the inverter's output can be used to reduce the power output of the inverter by using a relatively large duty cycle.

In FIG. 5(b) the output frequency of the inverter is at 10,000 Hertz and the power output is lower than the power output at 3,000 Hertz without pulse width modulation control, but still greater than the rated full power (current) of the inverter shown in FIG. 5(c). In the present invention pulse width modulation control of the inverter's output can be used with a lower duty cycle than that used at 3,000 Hertz to keep the power output of the inverter at or below rated value.

In general, in the present invention, pulse width modulation control is used to change the inverter's output power at any operating frequency from that which would occur without pulse width modulation control. In general duty cycle is decreased as frequency decreases to reduce the inverter's output power, and duty cycle is increased as frequency increases to increase the inverter's output power.

FIG. (6) further illustrates the characteristics of the load current with pulse width modulation control. When there is a non-zero inverter output voltage, the load current, $I_{LOAD}$, can be calculated from equation (6):

$$I_{LOAD} = \frac{V_{OUT}}{R_{LOAD}}\left(1 - e^{\frac{R_{LOAD}}{L_{LOAD}} \cdot t}\right).$$

When there is zero inverter output voltage, the load current can be calculated from equation (7):

$$I_{LOAD} = I_{INITIAL} \cdot e^{-\frac{R_{LOAD}}{L_{LOAD}} \cdot t}$$

where $I_{INITIAL}$ is the magnitude of current when the inverter output voltage transitions to zero.

Figure 6:
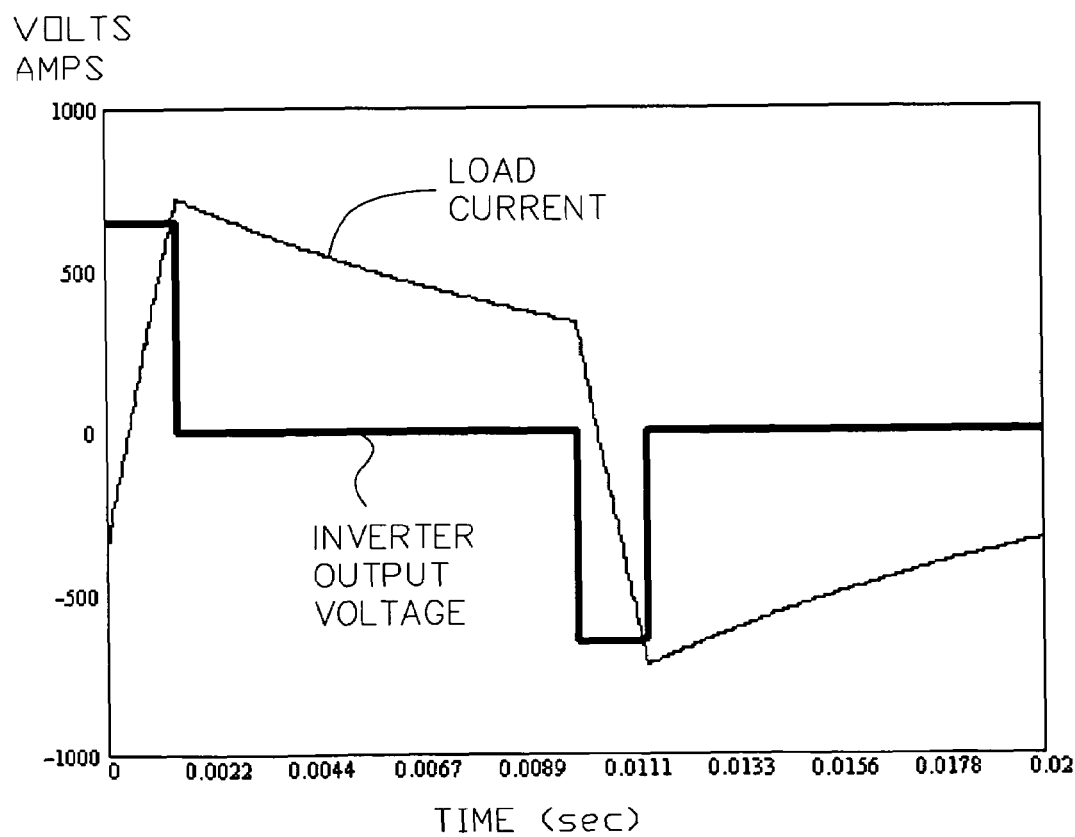
FIG. 6 illustrates the relationship between an inverter's output voltage and load current for an inverter using pulse width modulation in one example of the present invention.

From FIG. 6, the shorter the duty cycle, the smaller the peak value of the load current (and power) before the load current drops when the output voltage is zero. Conversely the longer the duty cycle, the larger the peak value of the load current (and power) before the load current drops when the output voltage is zero.

Figure 7:
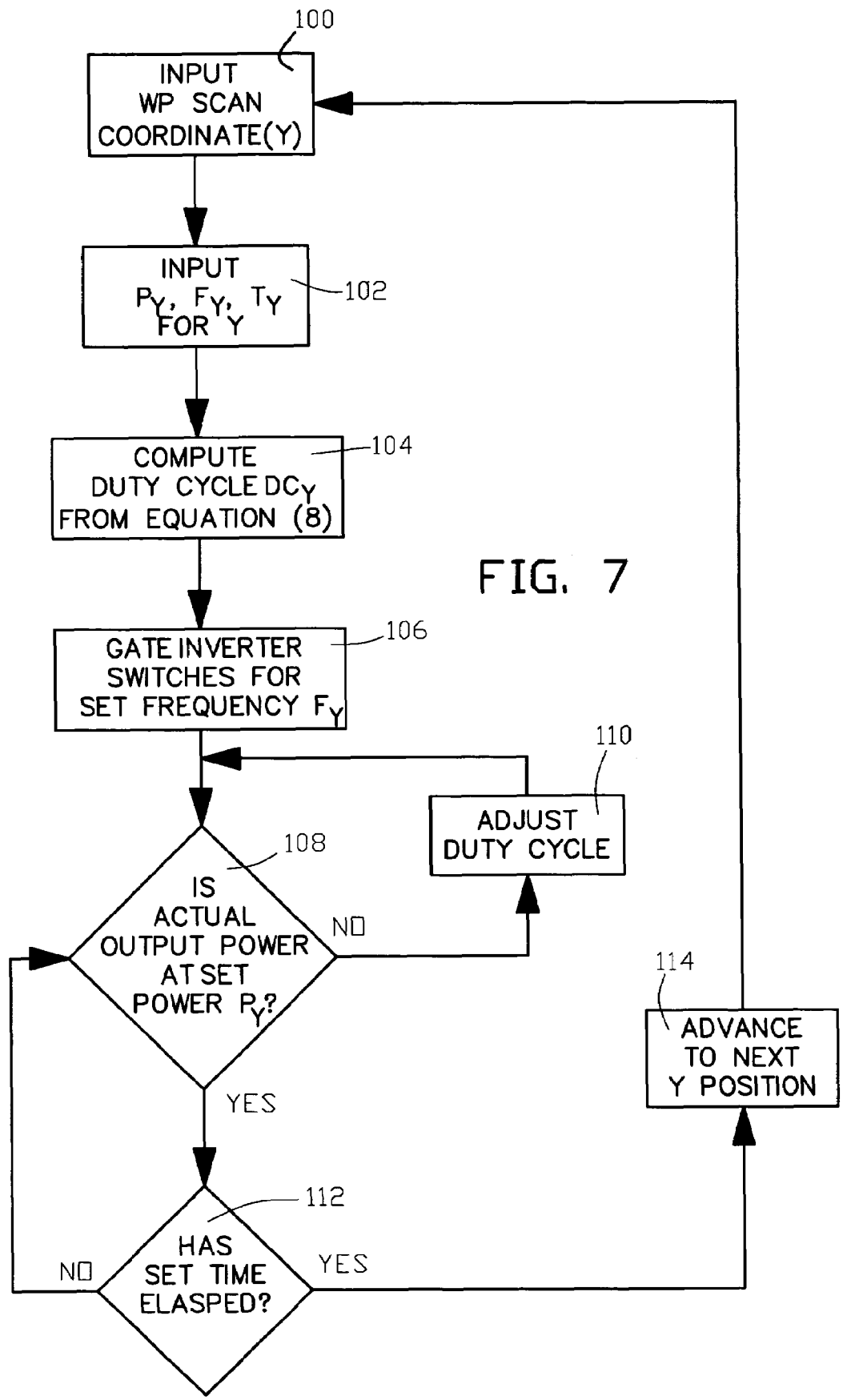
FIG. 7 is a simplified flow chart illustrating one example of the induction power control scheme of the present invention for controlling scan induction power as the output frequency of the inverter is changed during the scan.

FIG. 7 illustrates a simplified flowchart for one non-limiting example of the scan induction heating process of the present invention. The routines identified in the flowchart can be implemented in computer software that can be executed with suitable hardware. Routine 100 inputs a workpiece (WP) scan coordinate (Y) that represents the position of the workpiece within inductor 12. Routine 102 inputs values of power ($P_Y$), frequency ($F_Y$) and time ($T_Y$) for induction heating at position Y. These values may be previously stored in a memory device, for example, as a lookup table based upon values established by experimental testing of the workpiece with the apparatus. Alternatively an operator of the scan induction apparatus may manually input these values, or another method may be used to determine the required frequency, power level, and, if used, the variable time value for induction heat treatment of each position of the workpiece. Routine 104 computes the required duty cycle ($DC_Y$) for the inverter output from equation (8):

Duty Cycle (in percent)=[$P_Y$/P ($F_Y$)]×100, where P ($F_Y$) is calculated from equation (3) with an appropriate baseline load circuit determined from the actual workpiece being induction heat treated.

Routine 106 controls switching of the power supply's switching devices to achieve the desired output frequency and duty cycle. In this non-limiting example, routine 106 outputs gate inverter control signals to the gating circuits for the inverter's switches to achieve the required frequency, $F_Y$, and duty cycle, $DC_Y$. Routine 108 determines whether actual measured output power is at set power $P_Y$. Actual measured output power may be inputted by use of suitable sensing devices. If actual measured power is not equal to the required set power, then the duty cycle is appropriately adjusted in routine 110, and routine 108 repeats. If actual measured power is equal to the required set power, then routine 112 checks to see if set time $T_Y$ has expired. If the set time has not expired, then routine 108 is repeated; if set time has expired, then routine 114 outputs a control signal to the workpiece's positioning system to advance the workpiece to the next incremental position for induction heat treatment and returns to routine 100 for execution. In other examples of the invention the time for induction heating at each position Y will be the same for all positions of the workpiece within the inductor; for this arrangement, frequency control and duty cycle control, as frequency changes, are used to induction heat each position of the inductor as each position is stepped through the inductor at a constant rate of speed.

In other examples of the invention, movement and positioning of the workpiece through the inductor may be predetermined, for example, where an induction scan apparatus sequentially heat treats many identical workpieces. In these arrangements, power, frequency, time, and duty cycle settings at each position of the workpiece may be predetermined by experimental testing with the workpiece and the induction scan apparatus of the present invention, and executed without further inputting or computing any or all of these values for each successive identical workpiece heat treated with the apparatus. Incremental or sequential positioning of parts or features of the workpiece in the inductor can be accomplished as discrete stepped movement of the workpiece or inductor, or a combination of both, either as fine, minute steps that approach continuous movement of the workpiece or inductor, or coarser steps visually discernable as stepped movement. While the terms "selected part," "multiple features," and "locations" are used to describe sections of the workpiece placed within the inductor for induction heat treatment with variable frequency and duty cycle, the present invention includes varying the frequency and/or duty cycle while the part, feature or location passes through the inductor. That is subsections of each part, feature or location may be heat treated with varying frequencies and duty cycles as the subsections of the part, feature or location pass through the inductor.

In other examples of the invention pulse width modulation control can be used to control the inverter's power output as the output frequency of the inverter varies at a given workpiece position, for example, to achieve heat treatment and tempering for a feature of the workpiece. Further sequential heat treatment of features comprising the workpiece is not limited to sequential heat treatment in the order that the features are positioned in the workpiece. For example, referring to workpiece 14 in FIG. 1, features 14*a*, 14*b* and 14*c* may be positioned and heat treated sequentially in that order through inductor 12. Alternatively, for example, features 14*a*, 14*c* and 14*b* may be positioned and heat treated sequentially in that order through the inductor.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

The invention claimed is:

1. Apparatus for induction heating of a workpiece, the apparatus comprising:

a power source having an ac output with pulse width modulation control;

an inductor connected to the ac output to generate an ac magnetic field;

a means for moving the workpiece through the inductor to magnetically couple one or more selected parts of the workpiece with the magnetic field;

a positioning mechanism for sensing each of the one or more selected parts when coupled with the magnetic field;

a means for selectively adjusting the frequency of the ac output to a heat treatment frequency responsive to an output signal from the positioning mechanism; and a means for selectively adjusting the power of the ac output by changing the duty cycle of the ac output to a heat treatment duty cycle responsive to the heat treatment frequency.

2. The apparatus of claim 1 further comprising a means for selectively adjusting the period of time that each of the one or more selected parts is coupled with the magnetic field for induction heat treatment.

3. The apparatus of claim 1 wherein the means for selectively adjusting the frequency and power of the ac output comprises a processor having one or more output signals for control of the power source's output frequency and voltage.

4. The apparatus of claim 3 wherein the one or more output signals further comprises an output signal for controlling the means for moving the workpiece through the inductor responsive to the heat treatment frequency and duty cycle.

5. A method of electric induction heat treatment of a workpiece, the method comprising the steps of:

sequentially positioning the workpiece at a plurality of locations through at least one inductor;

supplying electric power to the at least one inductor to generate a magnetic field for coupling with the plurality of locations on the workpiece;

identifying the location of the workpiece presently coupled with the magnetic field;

adjusting the frequency of the electric power for the identified location of the workpiece; and adjusting the magnitude of the electric power by adjusting the duty cycle of the electric power when the frequency of the electric power is adjusted.

6. The method of claim 5 further comprising the step of adjusting the period of time that the identified location of the workpiece is coupled with the magnetic field.

7. The method of claim 5 further comprising the steps of adjusting the frequency of the electric power for the identified location of the workpiece to a frequency value stored in a memory device for the identified location, and adjusting the duty cycle of the electric power required for a magnitude of electric power stored in a memory device for the identified location.

8. The method of claim 7 further comprising the step of calculating the duty cycle of the electric power by dividing the magnitude of electric power stored in the memory device by a computed value for the electric power with 100 percent duty cycle.

9. The method of claim 6 further comprising the steps of adjusting the frequency of the electric power for the identified location of the workpiece to a frequency value stored in a memory device for the identified location; adjusting the duty cycle of the electric power required for a magnitude of electric power stored in a memory device for the identified location; and adjusting the period of time that the identified location of the workpiece is coupled with the magnetic field to a time value stored in a memory device for the identified location.

10. The method of claim 9 further comprising the step of calculating the duty cycle of the electric power by dividing the magnitude of electric power stored in the memory device by a computed value for the electric power with 100 percent duty cycle.

11. The method of claim 9 further comprising the steps of measuring the actual magnitude of electric power, comparing the actual magnitude of electric power with the magnitude of electric power stored in the memory device, and further adjusting the duty cycle of the electric power to eliminate any difference between the actual magnitude of electric power and the magnitude of electric power stored in the memory device.

12. The method of claim 11 further comprising the steps of measuring the actual period of time that the identified location of the work piece is coupled with the magnetic field to the time value stored in memory and advancing the workpiece to another one of the plurality of locations when the actual period of time is equal to the time value stored in memory.

13. The apparatus of claim 1 further comprising a sensor for sensing the actual power of the ac output and outputting the sensed actual power to the means for selectively adjusting the power of the ac output.

14. The method of claim 5 wherein the steps of adjusting the frequency and magnitude of the electric power further comprises increasing the duty cycle of the electric power when the frequency decreases and decreasing the duty cycle of the electric power when the frequency increases.

15. A method of electric induction heat treatment of a workpiece, the method comprising the steps of:

sequentially positioning the workpiece at a plurality of locations through at least one inductor;

supplying variable frequency electric power to the at least one inductor to generate a magnetic field for coupling with the plurality of locations on the workpiece;

identifying the location of the workpiece presently coupled with the magnetic field from the plurality of locations; and adjusting the magnitude of the electric power when the frequency changes by adjusting the duty cycle of the variable frequency electric power responsive to the identified location of the workpiece.

16. The method of claim 15 wherein the step of adjusting the magnitude of the electric power comprises decreasing the duty cycle when the frequency decreases and increasing the duty cycle when the frequency increases.

17. The method of claim 15 further comprising varying the period of time that each identified location of the plurality of locations is coupled with the magnetic field.

18. The method of claim 15 further comprising the steps of correlating the identified location with stored values for the frequency and magnitude of the electric power at each of the plurality of identified locations; adjusting the frequency to the stored value for the frequency; and adjusting the duty cycle for the stored value of the magnitude of electric power.

19. The method of claim 18 further comprising the steps of sensing the magnitude of the supplied variable frequency electric power to the at least one inductor, and adjusting the duty cycle if the sensed magnitude of the supplied variable frequency electric power is not equal to the stored value of the magnitude of electric power.

20. The method of claim 19 further comprising the step of adjusting the period of time that each identified location of the plurality of locations is coupled with the magnetic field to a stored value for the period of time at each of the plurality of identified locations.

* * * * *